(No Model.)
J. O. CHAMBERLIN.
MEASURING VESSEL.
No. 436,212. Patented Sept. 9, 1890.
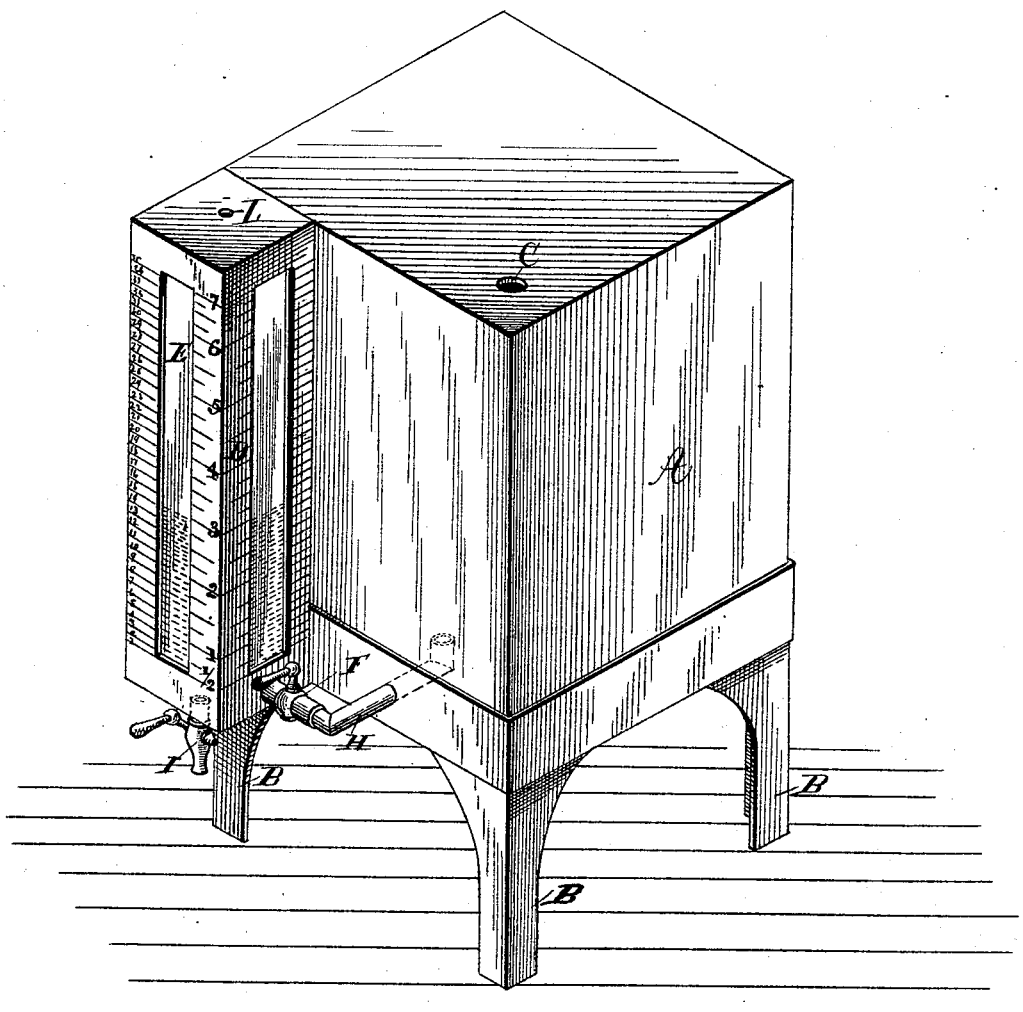
WITNESSES
F. L. Durand
N. M. Sterling
INVENTOR
Joseph O. Chamberlin
by L. W. Ginsabeneigh
Attorney

UNITED STATES PATENT OFFICE.

JOSEPH O. CHAMBERLIN, OF KIRKVILLE, IOWA.

MEASURING-VESSEL.

SPECIFICATION forming part of Letters Patent No. 436,212, dated September 9, 1890.

Application filed April 8, 1890. Serial No. 347,063. (No model.)

*To all whom it may concern:*

Be it known that I, JOSEPH O. CHAMBERLIN, a citizen of the United States, residing at Kirkville, in the county of Wapello and State of Iowa, have invented new and useful Improvements in Measuring Devices; and I do hereby declare the following to be a full, clear, and exact description of said invention, reference being had to the accompanying drawing, and to the letters of reference marked thereon, which form a part of this specification.

My invention relates to new and useful improvements in measuring devices for drawing off an ascertained quantity of liquid, and is especially adapted to be combined with a tank for containing liquids.

The object of my invention is to provide a suitable graduated vessel or compartment on the outer side of a tank communicating with the interior thereof for drawing off immediately from the tank any desired quantity of liquid without the necessity of using the commonly-known measuring devices, and also for ascertaining the exact quantity of liquid remaining in the tank at any time.

The invention consists in the combination, with a tank or vessel, of a suitable graduated compartment or measuring-vessel, said measuring-vessel being formed with a transparent portion extending from top to bottom, or as much so as desired, having different graduated scales marked thereon, whereby a given quantity of liquid from the tank can be measured before drawing off, and the exact quantity in the tank ascertained when desired.

The invention further consists in the construction and arrangement of parts, all as hereinafter described.

In the accompanying drawing I have shown a perspective of a tank or storage-chamber provided with my improved measuring device.

The tank A, to which the measuring device is attached, may be of any desired form and construction; but the form shown in the illustration is one of preferable design, being rectangular and provided with suitable legs or supports B and a suitable opening C in the top, through which the tank is filled.

The measuring chamber or compartment D is secured to the tank A at any suitable portion, and extends in a vertical position from the top to the bottom of the tank or below the bottom of tank sufficient to hold one gallon or more. This may be constructed as shown, being formed of any suitable material and having the portion E, for observing the liquid, made of glass or any other transparent material through which the liquid may be observed.

On each side of the observation-plate E is provided a suitable graduated scale, the one on the right-hand side indicating the quantity of liquid in the measuring-chamber by the number or character on said scale registering with the height of the liquid, and the scale on the left-hand side indicating the quantity of liquid at any time in the tank A by allowing said liquid to seek its level in the measuring-chamber D, there being a ratio existing between the tank and measuring-chamber by which the scale is formed. Thus we will say the capacity of the tank is thirty-five gallons and the chamber D seven gallons, and the liquid, being allowed to seek its level in the chamber D, will register at the top digit thirty-five gallons.

Again, it is not known how much liquid remains in the tank. The valve F is opened and the liquid rises to "15," indicating the number of gallons contained in the tank. This, it will be understood, includes the quantity in the measuring-chamber, which in this case, is three gallons, as indicated by the scale on the right-hand side. Otherwise there is only twelve gallons in the tank proper; but by measuring the quantity which is in the chamber D by the liquid seeking its level and knowing the ratio which exists between the measuring-chamber and the tank, which can always be found by mathematical computation, the quantity in the tank is indicated in gallons, quarts, or as it may be desired. On this principle the scale on the left-hand side is formed.

It will be understood that the scales need not have the same relative position to each other, for the side on which they are marked is of no consequence, except as a matter of arrangement, and the two scales may be on only one side or be made so that one will form a part of the other.

The pipe H, which communicates with the interior of the tank from the chamber D, is located at the bottom and extends out from the tank and enters the measuring-chamber at right angles, allowing a valve F to be provided therein in a suitable place to be operated.

The drawing-off cock I is located under the measuring device, but may be placed in any suitable location.

An aperture is formed in the top of the measuring-chamber to allow the admission of air when the liquid is drawn off, and the expulsion of the air when the chamber is being filled from the tank.

For convenience in determining when the oil or other liquid has reached the desired mark on the scale, and also for providing a means for leveling the tank, I have provided a similar transparent portion in one side of the measuring-receptacle, as is found on the face. By this device light is admitted, and the rise of liquid is easily distinguished, and also the tank is leveled by causing the liquid to register with both scales.

Having now described my invention, what I claim, and desire to secure by Letters Patent, is—

1. In a device for containing and measuring liquids, a storage-chamber and a measuring-chamber communicating therewith, said measuring-chamber or stand-pipe being provided with two scales, whereby any desired quantity of liquid may be measured off from the tank and the exact quantity of liquid contained in the tank or storage-chamber indicated or determined, substantially as set forth.

2. In a device for containing and measuring liquids, a storage-chamber and a measuring-chamber communicating therewith, said measuring-chamber being provided with transparent face or faces having two scales, whereby any desired quantity of liquid may be measured off from the tank and the exact quantity of liquid contained in the tank or storage-chamber indicated or determined, substantially as set forth.

In testimony whereof I affix my signature in the presence of two subscribing witnesses.

JOSEPH O. CHAMBERLIN.

Witnesses:
B. L. WARD,
A. W. BROWN.